United States Patent
Ballard et al.

(10) Patent No.: US 10,361,948 B2
(45) Date of Patent: Jul. 23, 2019

(54) COMMUNICATION LOOP PREVENTION IN AN INFORMATION HANDLING SYSTEM

(71) Applicant: DELL PRODUCTS, L.P., Round Rock, TX (US)

(72) Inventors: Lee E. Ballard, Georgetown, TX (US); Michael E. Brown, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 117 days.

(21) Appl. No.: 15/447,208

(22) Filed: Mar. 2, 2017

(65) Prior Publication Data
US 2018/0254985 A1 Sep. 6, 2018

(51) Int. Cl.
| H04L 12/28 | (2006.01) |
| H04L 12/753 | (2013.01) |
| H04L 12/775 | (2013.01) |
| H04L 12/937 | (2013.01) |
| H04L 12/24 | (2006.01) |
| H04L 12/931 | (2013.01) |

(52) U.S. Cl.
CPC .......... *H04L 45/48* (2013.01); *H04L 45/583* (2013.01); *H04L 49/253* (2013.01); *H04L 41/12* (2013.01); *H04L 49/70* (2013.01)

(58) Field of Classification Search
CPC ....... H04L 45/48; H04L 41/12; H04L 45/583; H04L 49/253
See application file for complete search history.

(56) References Cited

U.S. PATENT DOCUMENTS

| 6,778,506 | B1 | 8/2004 | McDonnell et al. | |
| 8,514,746 | B1* | 8/2013 | Goli | H04L 12/462 370/216 |
| 8,559,341 | B2 | 10/2013 | Bulusu | |
| 2006/0285499 | A1 | 12/2006 | Tzeng | |
| 2007/0014234 | A1* | 1/2007 | Santoso | H04L 43/0817 370/216 |
| 2011/0019535 | A1* | 1/2011 | Nakashima | H04L 41/12 370/218 |
| 2011/0292833 | A1* | 12/2011 | Kapitany | H04L 12/437 370/254 |
| 2012/0113870 | A1* | 5/2012 | Chuang | H04L 12/462 370/255 |
| 2014/0269701 | A1* | 9/2014 | Kaushik | H04L 45/586 370/390 |
| 2016/0119183 | A1 | 4/2016 | Gopalarathnam | |
| 2016/0234100 | A1 | 8/2016 | Narasimhan et al. | |
| 2016/0315964 | A1* | 10/2016 | Shetty | H04L 63/105 |

* cited by examiner

*Primary Examiner* — Clemence S Han
(74) *Attorney, Agent, or Firm* — Isidore PLLC

(57) ABSTRACT

A method, an information handling system (IHS) and a switching system for preventing communication loops in an IHS. The method includes identifying, via a controller, at least one stacking port in a first switch of a first chassis. The first switch is in communication with a second switch of a second chassis via a first link. At least one stacking port is configured as an unblocked port. Port blocking and unblocking actions are determined for the at least one stacking port. The at least one stacking port is configured based on the determined port blocking and unblocking actions and a determination is made if the first chassis is a root bridge chassis having at least one uplink port. In response to the first chassis being a root bridge chassis, a first uplink port in the first switch is configured as an unblocked port.

20 Claims, 11 Drawing Sheets

COMMUNICATION LOOP PREVENTION IN AN INFORMATION HANDLING SYSTEM

BACKGROUND

1. Technical Field

The present disclosure generally relates to information handling systems and in particular to prevention of communication loops in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications.

The information handling system can be a distributed information handling system. The distributed information handling system includes a computer network having several groups of computers, servers, or computing nodes that are in communication with each other over a communications network. The communication network allows the computers and/or computing nodes in the network to exchange data and information. The computing nodes can be in communication with each other via a switch having ports. Unfortunately, the ports are conventional ports and thereby unmanaged ports that do not have spanning tree protocol (STP) or other protocols running to prevent communication loops. Further, the conventional ports are not able to manage forwarding on redundant links. If a user connects multiple ports from an information handling system with an embedded switch or multiple ports from a stacked group of information handling systems with embedded switches, an endless Ethernet forwarding loop can be created that can cause the local area network to fail.

In addition without STP or another protocol to manage redundant links, stacked information handling systems with embedded unmanaged switches will maintain separate active and standby lanes through the stack. There is no way to route around an individual link failure without failing the whole lane below the point of the failure. If the uplink on the active side of a redundant stacked information handling system fails, the node must disable its stacking port to force nodes below it or downstream in the stack to switch over to the other lane causing cascading failures.

BRIEF SUMMARY

Disclosed are a method, an information handling system (IHS) and a switching system for preventing communication loops and redundancy in an IHS stack with embedded switches.

According to one embodiment, the method includes identifying, via a controller, at least one stacking port in a first switch of a first chassis. The first switch is in communication with a second switch of a second chassis via a first link. At least one stacking port is configured as an unblocked port. Port blocking and unblocking actions are determined for the at least one stacking port of the first switch. The at least one stacking port is configured based on the determined port blocking and unblocking actions and a determination is made whether the first chassis is a root bridge chassis having at least one uplink port. In response to the first chassis being a root bridge chassis, a first uplink port in the first switch is configured as an unblocked port.

According to another embodiment, an IHS includes a first chassis including a first chassis management device communicatively coupled to at least one processing node. The first chassis management device includes a controller communicatively coupled to a first switch. The first switch includes at least one stacking port and at least one uplink port. A second chassis includes a second switch. The first switch is in communication with the second switch via a first link. The chassis management device includes a memory device communicatively coupled to the controller. The memory device stores stacked chassis loop prevention (SCLP) firmware. The SCLP firmware configures the controller to identify at least one stacking port in the first switch and configure the at least one stacking port as an unblocked port. Port blocking and unblocking actions are determined for the at least one stacking port of the first switch. The at least one stacking port is configured based on the determined port blocking and unblocking actions. The SCLP firmware further configures the controller to determine if the first chassis is a root bridge chassis having at least one uplink port, and in response to the first chassis being a root bridge chassis, the controller configures a first uplink port in the first switch as an unblocked port.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
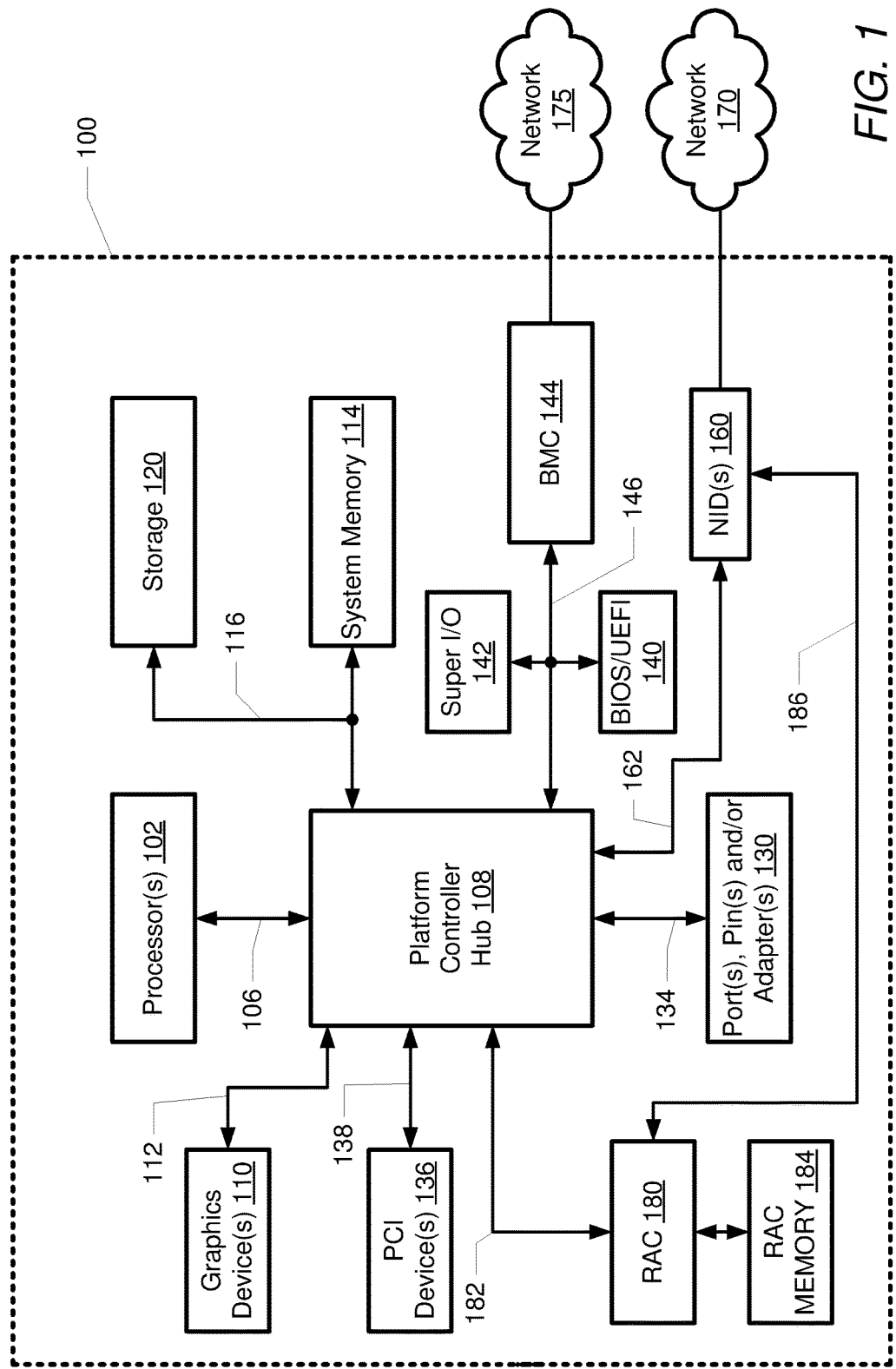
FIG. 1 illustrates one example of an IHS within which various aspects of the disclosure can be implemented, according to one or more embodiments.

The illustrative embodiments provide a method, an information handling system (IHS) and a switching system for preventing communication loops in an IHS. The method includes identifying, via a controller, at least one stacking port in a first switch of a first chassis. The first switch is in communication with a second switch of a second chassis via a first link. At least one stacking port is configured as an unblocked port. Port blocking and unblocking actions are determined for the at least one stacking port. The at least one stacking port is configured based on the determined port blocking and unblocking actions and a determination is made if the first chassis is a root bridge chassis having at least one uplink port. In response to the first chassis being a root bridge chassis, a first uplink port in the first switch is configured as an unblocked port.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, an example of IHS 100 is shown. IHS 100 includes one or more processor(s) 102. In various embodiments, IHS 100 may be a single-processor system including one processor or a multi-processor system including two or more processor(s) (e.g., two, four, eight, or any other suitable number). Processor(s) 102 may include any processor capable of executing program instructions. In an embodiment, a motherboard is provided, configured to provide structural support, power, and electrical connectivity between the various aforementioned components. Such a motherboard may include multiple connector sockets in various configurations, adapted to receive pluggable circuit cards, component chip packages, etc.

Processor(s) 102 are coupled to a chipset or platform controller hub (PCH) 108 via front-side bus 106. PCH 108 may be configured to coordinate I/O traffic between processor(s) 102 and other components. For example, in this particular implementation, PCH 108 is coupled to graphics device(s) 110 (e.g., one or more video cards or adaptors, etc.) via a graphics bus 112 (e.g., an Accelerated Graphics Port or AGP bus, a Peripheral Component Interconnect (PCI) bus, etc.). PCH 108 is also coupled to system memory 114 via memory bus 116. System memory 114 may be configured to store program instructions and/or data accessible by processor(s) 102. In various embodiments, system memory 114 may be implemented using any suitable memory technology, such as static RAM (SRAM), synchronous dynamic RAM (SDRAM), nonvolatile/Flash-type memory, or any other type of memory.

Also coupled to memory bus 116 is a storage device or storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 114 during operation of IHS 100. PCH 108 is also coupled to one or more PCI devices 136 (e.g., modems, network cards, sound cards, video cards, shared memory etc.) via a PCI bus 138.

PCH 108 is further coupled to port(s), pin(s), and/or adapter(s) 130 over a bus 134. Generally, PCH 108 may be configured to handle various I/O operations, and PCH 108 may provide interfaces such as, for instance, Universal Serial Bus (USB), audio, serial, parallel, Ethernet, etc., via port(s), pin(s), and/or adapter(s) 130 over bus 134. For example, PCH 108 may be configured to allow data to be exchanged between IHS 100 and other devices, such as other IHSs attached to a network. In various embodiments, PCH 108 may support communication via wired or wireless general data networks, such as any suitable type of Ethernet network, via telecommunications/telephony networks, such as analog voice networks or digital fiber communications networks, via storage area networks such as Fiber Channel SANs, or via any other suitable type of network and/or protocol.

PCH 108 may also enable connection to one or more input devices, such as keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. PCH 108 is also coupled to basic input output system/unified extensible firmware interface (BIOS/UEFI) 140, super I/O Controller 142, and baseboard management controller (BMC) 144 via Low Pin Count (LPC) bus 146.

BIOS/UEFI 140 includes non-volatile memory having program instructions stored thereon. Those instructions may be usable by processor(s) 102 to initialize and test other hardware components and/or to load an Operating System (OS) onto IHS 100. As such, (BIOS/UEFI) 140 may include a firmware interface that allows processor(s) 102 to load and execute certain firmware, as described in more detail below. In some cases, such firmware may include program code that is compatible with the Unified Extensible Firmware Interface (UEFI) specification, although other types of firmware may be used.

BMC 144 may include non-volatile memory having program instructions stored thereon that are usable by processors(s) 102 to enable remote management of IHS 100. For example, BMC 144 may enable a user to discover, configure, and manage BMC 144, setup configuration options, resolve and administer hardware or software problems, etc. Additionally or alternatively, BMC 144 may include one or more BMC firmware volumes, each volume having one or more firmware files used by the BIOS' firmware interface to initialize and test components of IHS 100. Super I/O Controller 142 combines interfaces for a variety of lower bandwidth or low data rate devices. Those devices may include, for example, floppy disks, parallel ports, a keyboard and mouse and other devices. BMC 144 is in communication with a management network 175, via a dedicated network interface, using one or more communication protocol.

In some cases, IHS 100 may be configured to access different types of computer-accessible media separate from system memory 114. Generally speaking, a computer-accessible memory device may include any tangible, non-transitory storage media or memory media such as electronic, magnetic, or optical media (e.g., magnetic disk, a hard drive, a CD/DVD-ROM, a Flash memory, etc.) coupled to IHS 100 via PCH 108. Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

IHS 100 further comprises one or more network interface devices (NID(s)) 160 coupled to PCH 108 via PCI bus 162. NID(s) 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

IHS 100 further includes a remote access controller (RAC) 180 coupled via a PCI bus 182 to PCH 108. RAC 180 provides management functions that allow an administrator to deploy, monitor, manage, configure, update, troubleshoot, and remediate IHS 100. RAC 180 is also coupled to RAC memory 184. In one embodiment, RAC memory 184 can be shared with processor(s) 102. RAC 180 is also communicatively coupled to NID(s) 160 via a sideband bus 186.

RAC 180 monitors and controls the operation of IHS 100 and other systems and devices communicatively coupled to IHS 100. RAC 180 can also perform configuration and remote control of other connected IHSs. Certain software and/or firmware modules stored in RAC memory 184 can be executed by RAC 180. Processor(s) 102 and RAC 180 include specific firmware that enables processor(s) 102 and RAC 180 to perform the various functions described herein.

A person of ordinary skill in the art will appreciate that IHS 100 is merely illustrative and is not intended to limit the scope of the disclosure described herein. In particular, any computer system and/or device may include any combination of hardware or software capable of performing certain operations described herein. For instance, although IHS 100 is illustrated following a first type architecture, various systems and methods described herein may be adapted to work with any other architecture having a different chipset and/or RAC configuration. In addition, the operations performed by the illustrated components may, in some embodiments, be performed by fewer components or distributed across additional components. Similarly, in other embodiments, the operations of some of the illustrated components may not be performed and/or other additional operations may be available. In other implementations, one or more of the devices or components shown in FIG. 1 may be absent, or one or more other components may be added. Accordingly, systems and methods described herein may be implemented or executed with other computer system configurations.

Figure 2:
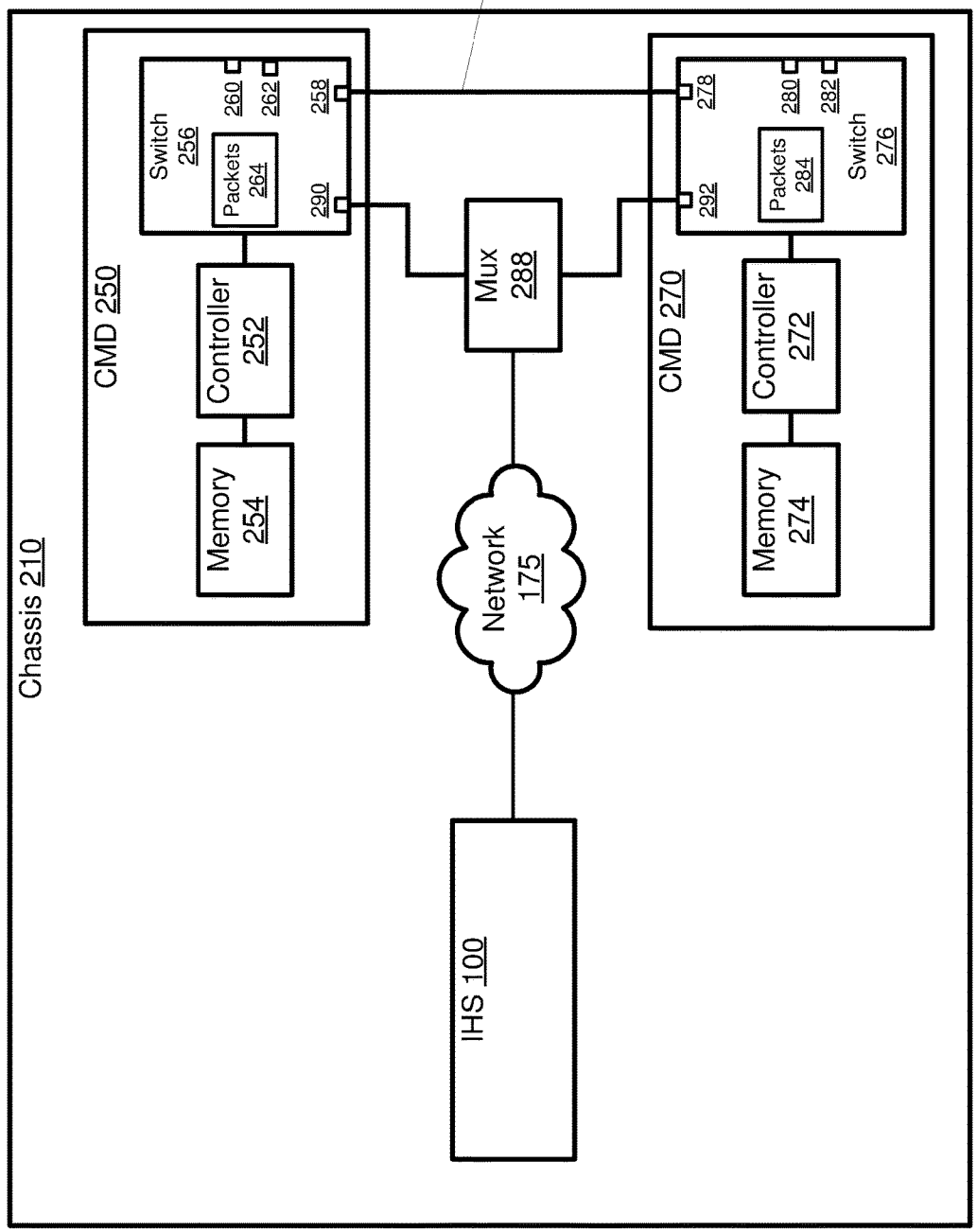
FIG. 2 illustrates an example chassis including multiple IHSs and chassis management control devices, according to one or more embodiments.

In the description of the following figures, reference is also made to specific components illustrated within each of the preceding figures. Referring to FIG. 2, a computing chassis 210 is shown. Computing chassis 210 includes one or more IHSs, such as IHS 100. A chassis management device (CMD) 250 and a CMD 270 are communicatively coupled to IHS 100 via management network 175, such as an Ethernet network and multiplexer (Mux) 288. CMD 250 includes a controller 252 that is communicatively coupled to first memory device 254 and first switch 256. CMD 270 includes a controller 272 that is communicatively coupled to second memory device 274 and second switch 276.

First and second switches 256 and 276 are basic switch devices that couple IHSs and chassis together using packet switching to receive, process, and forward data from an originating device to a destination device. First switch 256 includes packets 264 and several ports including ports 260, 262, 258 and 290. Second switch 276 includes packets 284 and several ports including ports 280, 282, 278 and 292. First and second switches 256 and 276 are communicatively coupled to each other by a network link 231 between ports 258 and 278. Ports 290 and 292 are communicatively coupled to Mux 288. Controller 252 can control ports 258, 260 and 262 to be blocked and unblocked. Controller 272 can control ports 278, 280 and 282 to be blocked and unblocked. Mux 288 connects IHS 100 to only one CMD switch (the active CMD) at a time allowing one port of IHS 100 to be connected to two CMD ports.

When a port is blocked, the transmission and receiving of packets through the port is prevented other than for packets that are bridge protocol data units (BPDUs). When a port is unblocked, the transmission and receiving of packets through the port is permitted. Switches 256 and 276 route packets between various processing nodes and other switches. Packets 264 and 284 are groups of bits that can be transported across a network. In one or more embodiments, the ports are connected to one or more other switches or other chassis.

Figure 3:
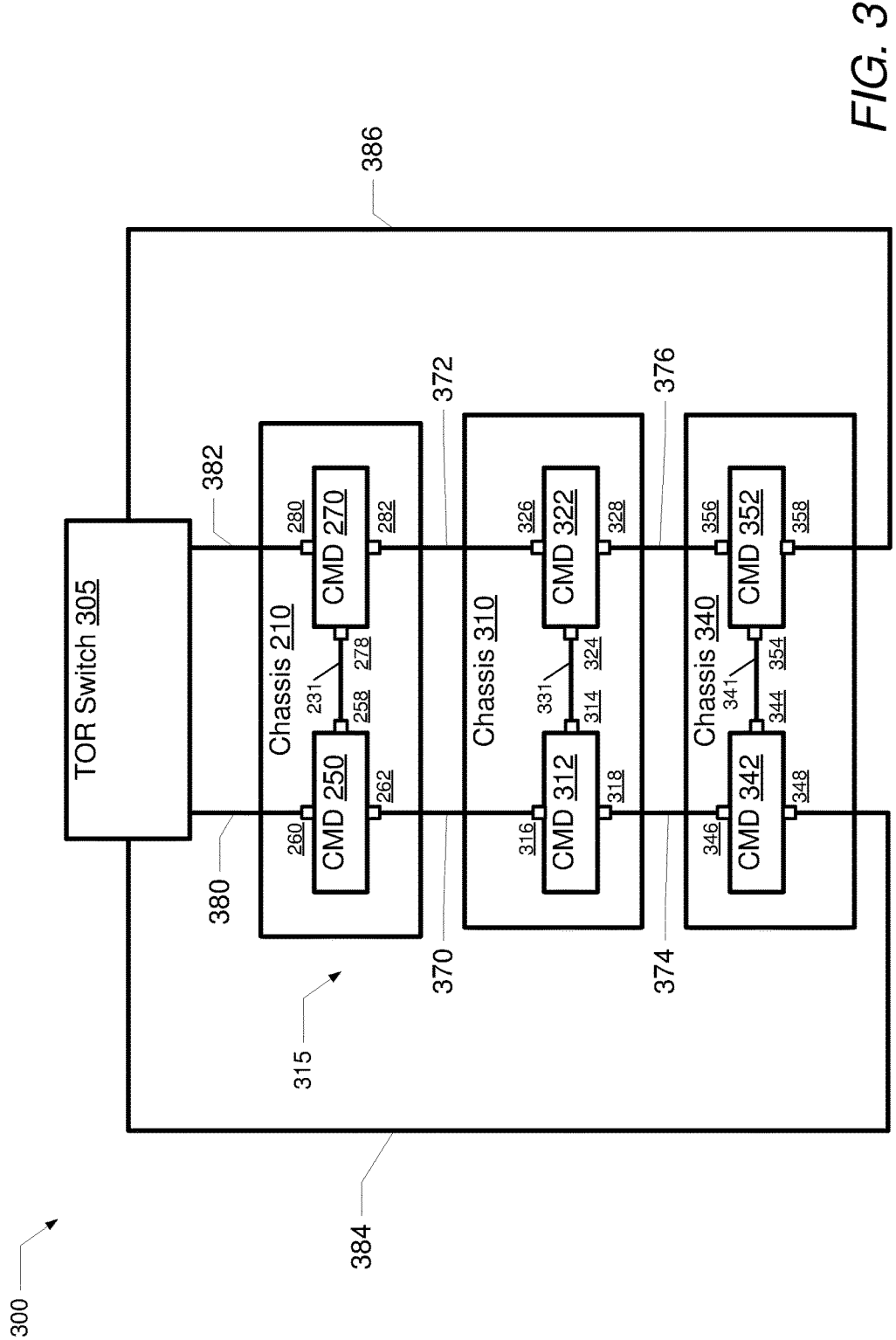
FIG. 3 illustrates an example rack-configured, networked computing environment, including multiple chassis and a top of rack switch, according to one or more embodiments.

Referring to FIG. 3, a networked computing environment or system 300 is shown. Networked computing system 300 includes a top of rack (TOR) switch 305 and a stack of chassis 315 including chassis 210, 310, and 340. TOR switch 305 is a feature rich switch that can handle L2 (data link layer) and L3 (network layer) processing and data center bridging for a rack of servers. Each chassis 310 and 340 can have the same internal components as chassis 210 of FIG. 2. Chassis 310 includes CMD 312 and CMD 322. CMD 312 has stacking ports 314, 316 and 318 and MD 322 has stacking ports 324, 326 and 328. CMD 312 and CMD 322 are communicatively coupled to each other by link 331 extending between ports 314 and 324. A controller within CMD 312 can control or cause ports 314, 316 and 318 to be blocked and unblocked. Another controller within CMD 322 can control or cause ports 324, 326 and 328 to be blocked and unblocked.

Chassis 340 includes a CMD 342 and a CMD 352. CMD 342 has stacking ports 344, 346 and 348 and CMD 352 has stacking ports 354, 356 and 358. CMD 342 and CMD 352 are communicatively coupled to each other by link 341 extending between ports 344 and 354. A controller within CMD 342 can cause ports 344, 346 and 348 to be blocked and unblocked. Another controller within CMD 352 can cause ports 354, 356 and 358 to be blocked and unblocked.

If a port is connected from one stackable chassis to another stackable chassis it is defined as a stacking port. Ports that are connected to all other devices (including the TOR switch) are defined as uplink ports. In FIG. 3, ports 258, 262, 278, 282, 314-318, 324-328, 344, 346, 354 and 356 are stacking ports and ports 260, 280, 348 and 358 are uplink ports. This determination of whether a port is a stacking port or an uplink port is dynamic and automatically determined based on link level discovery protocol (LLDP).

TOR switch 305 is in communication with chassis 210, via uplink 380 to port 260 and uplink 382 to port 280. TOR switch 305 is in communication with chassis 340, via uplink 384 to port 348 and uplink 386 to port 358. Chassis 210 is in communication with chassis 310, via stacking link 370 between ports 262 and 316 and stacking link 372 between ports 282 and 326. Chassis 310 is in communication with chassis 340, via stacking link 374 between ports 318 and 346 and stacking link 376 between ports 328 and 356.

In networked computing system 300, the uplink ports carry external data traffic (from systems beyond the TOR switch to the systems in the chassis or the CMD) and the stacking ports carry both external data and internal data traffic between the stacked chassis. The chassis to chassis data communication traffic is used to create a loop free topology inside the stacked chassis. In one embodiment, STP or another loop prevention protocol or algorithm can be used by the stacked chassis to create a loop free topology. The stacked chassis to chassis internal data traffic on the stacking ports are separated from external data traffic using a reserved virtual local area network (VLAN) or other mechanism such as tunneling or a virtual private network (VPN) between the chassis. The STP or other loop prevention protocol or algorithm are hidden or concealed from the view of external user on a reserved VLAN or over private tunnels that are automatically configured using LLDP or another neighbor discovery mechanism. The use of the loop prevention protocol or other loop prevention protocol is limited to the stack of chassis (i.e. chassis 210, 310 and 340). This automatic containment of the STP within the stack of chassis and the prevention of STP from leaving the stack of chassis can prevent problems in external customer networks that are in communication with networked computing system 300. The root bridge priority is set based on the quality of the links that bridge the "inside" stack of chassis to the external or "outside" customer equipment. The root bridge priority is used to determine the root bridge chassis.

Figure 4B:
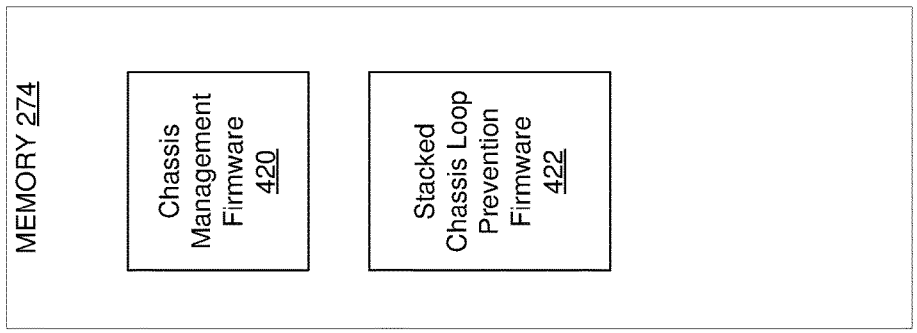
FIG. 4B illustrates example contents of a standby chassis management controller memory device, in accordance with one embodiment.
Figure 4A:
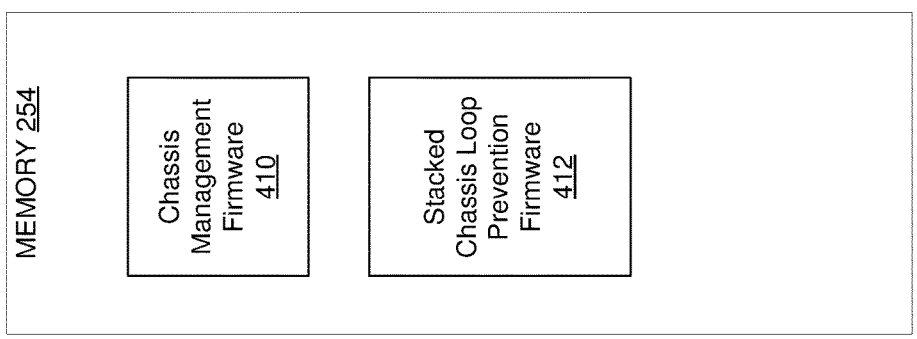
FIG. 4A illustrates example contents of an active chassis management controller memory device, in accordance with one embodiment.

With reference now to FIG. 4A, one embodiment of example contents of memory 254 of CMD 250 (FIG. 2) is shown. Memory 254 includes data, software, and/or firmware modules, including chassis management firmware 410 and stacked chassis loop prevention firmware 412. Memory 254 can also include other data, software, and/or firmware modules. Chassis management firmware 410 enables controller 252 to configure, manage and monitor multiple IHSs and networking and storage functions within chassis 210. Stacked chassis loop prevention firmware 412 enables controller 252 to prevent communication loops with other chassis and TOR switches. In particular, stacked chassis loop prevention firmware 412 implements a chassis loop prevention protocol to prevent communication loops in stacked chassis.

Turning to FIG. 4B, one embodiment of example contents of memory 274 of CMD 270 (FIG. 2) is shown. Memory 274 includes data, software, and/or firmware modules including chassis management firmware 420 and stacked chassis loop prevention firmware 422. Memory 274 can also include other data, software, and/or firmware modules. Stacked chassis management firmware 420 enables controller 272 to configure, manage and monitor multiple IHSs, networking and storage functions within chassis 210. Stacked chassis loop prevention firmware 422 enables controller 272 to prevent communication loops with other chassis and TOR switches. Chassis loop prevention firmware 422 implements a chassis loop prevention protocol to prevent communication loops in stacked chassis. In another embodiment, stacked chassis management firmware 420 could be used to prevent communication loop in stacked voice over internet protocol (VoIP) devices, in stacked terminal servers or in other stacked devices of the same type.

In one embodiment, controller 252 executes stacked chassis loop prevention firmware 412 to prevent communication loops. The stacked chassis loop prevention firmware 412 configures controller 252 to identify at least one stacking port 262 in switch 256 of chassis 210. Controller 252 determines port blocking and unblocking actions for switch 256 and configures the stacking ports based on the determined port blocking and unblocking actions. Controller 252 determines if chassis 210 is a root bridge chassis, and in response to chassis 210 being the root bridge chassis, controller 252 configures an uplink port 260 as an unblocked port.

Figure 5:
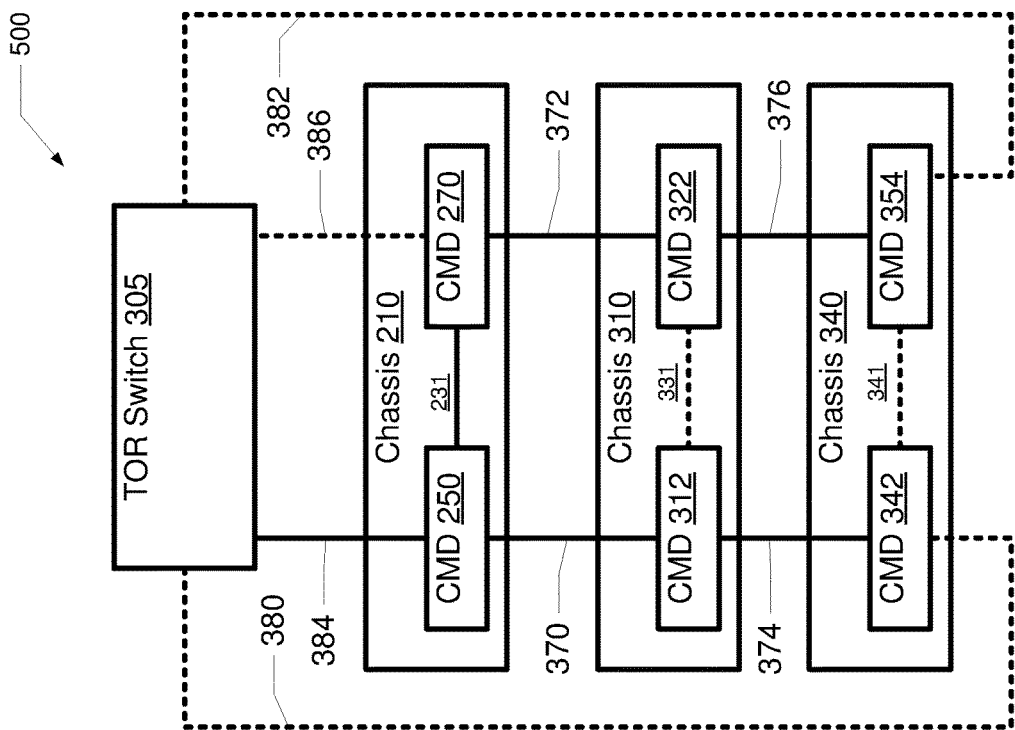
FIG. 5 illustrates an example of a networked computing environment showing forwarding and blocking links using a chassis loop prevention protocol, according to one or more embodiments.

FIG. 5 illustrates an example networked computing system 500 showing the forwarding and blocking links using a chassis loop prevention protocol. Each controller within each chassis determines an internal STP bridge priority value based on whether or not the chassis has an uplink and the quality of the uplink. For example, controller 252 (illustrated in FIG. 2) within CMD 250 determines a STP bridge priority value for each of the uplink ports in switch 256 (illustrated in FIG. 2). According to one embodiment, the highest byte of bridge priority is 0xC if there is no TOR switch connection, or no link, 0x4 if there is a low speed connection such as 100 Mb to the TOR switch, and 0x0 for the best speed connection such as 1 Gb to the TOR switch. The better the connection, the lower the bridge priority. The bridge priority is prefixed to the media access control (MAC) address of each of the CMDs. The CMD with the best connection and lowest MAC address becomes the root switch or bridge. If a CMD TOR switch connection changes, the priority changes and the root election process will re-run to determine the root bridge. In FIG. 5, CMD 250 has the lowest STP bridge priority value and has been selected as the root bridge.

STP is enabled by chassis to chassis data communication traffic on reserved VLANs or tunnels between chassis. The chassis first organize themselves into a loop free stack with all ports not connected to other chassis blocked. After a loop free stack has been defined, a root (master) of that stack is determined and the root (master) unblocks one link from the entire stack to external communications. Because there is only one route into the stacked chassis and there are no loops inside the stack chassis, the networked communication system is loop free.

For example, the root bridge or switch is the switch at the top of the spanning tree. The branches (Ethernet connections) are then branched out from the root switch, connecting to other switches. The CMDs configure the ports such that only one uplink 384 is enabled as a forwarding link (solid lines). The other uplinks 380, 382 and 386 are blocking links (dotted lines). Stacking links 370, 372, 374 and 376 are enabled as forwarding links. ISL 231 is enabled as a forwarding link and ISLs 331 and 341 are configured as blocking links. The chassis loop prevention firmware first creates a loop free topology inside the collective stacked chassis 210, 310 and 340 by sending STP BPDUs on a reversed VLAN, tunnel or VPN to stacked chassis 210, 310 and 340 and utilizing a spanning tree protocol (STP) or similar algorithm. After a loop free stacked chassis 210, 310 and 340 is created, only one forwarding uplink (i.e. uplink 384) is allowed, thus preventing the stacked chassis from creating a communication loop.

Figure 6:
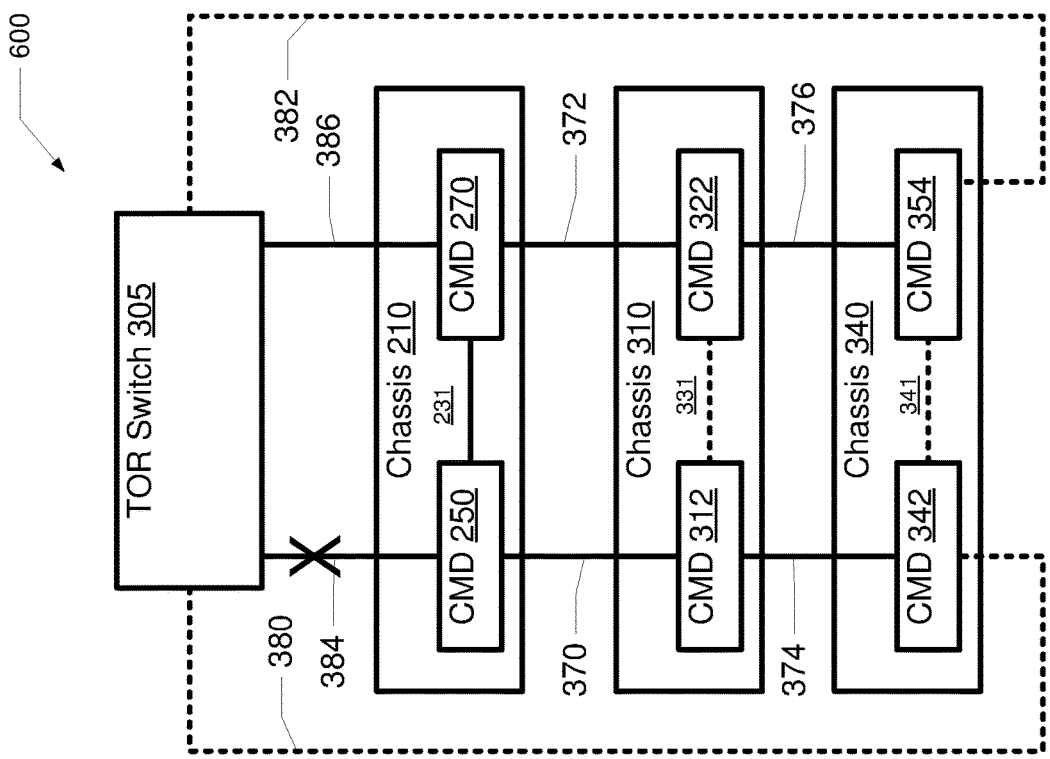
FIG. 6 illustrates an example of a networked computing environment when an uplink failure between a chassis and a top of rack switch occurs, according to one or more embodiments.

FIG. 6 illustrates an example rack configured networked computing system 600 when a failure of uplink 384 occurs. FIG. 6 further shows the forwarding and blocking links using a chassis loop prevention protocol. In the case of a failure of the uplink 384 to TOR switch 305, (indicated by X), controller 270 (FIG. 2) executing chassis loop prevention firmware 422 (FIG. 4) will unblock port 280 (FIG. 2), enabling uplink 386 as a forwarding link, as shown in FIG. 6. The loss or degradation of an uplink causes the current root node to raise the current root priority value for the CMD. If there is any other CMD controller in the stack with a lower root priority value, that CMD controller will take control and unblock one uplink.

Figure 7:
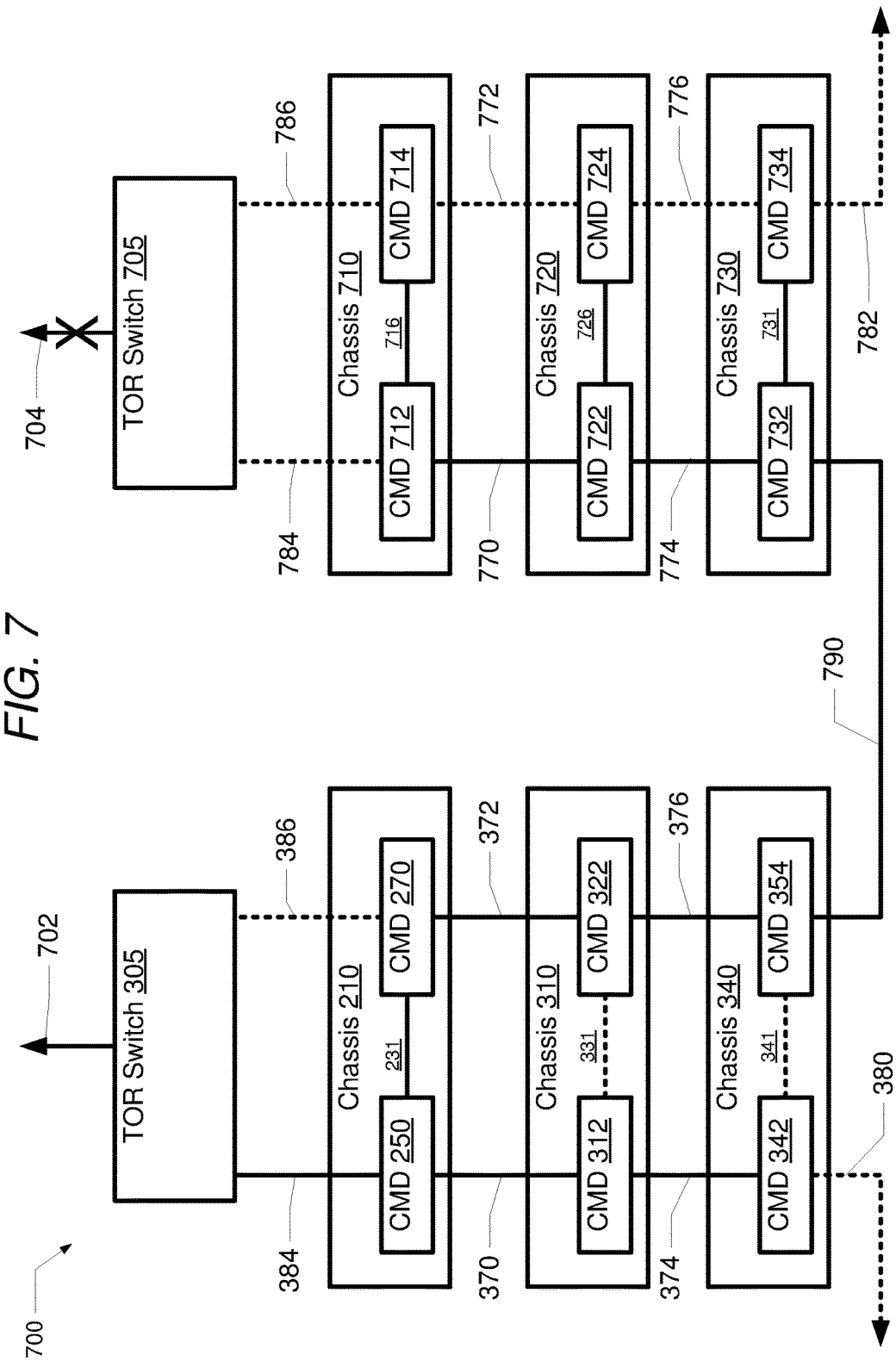
FIG. 7 illustrates an example of a networked computing environment when an uplink failure from a top of rack switch to an external connection occurs, according to one or more embodiments.

FIG. 7 illustrates an example rack-configured networked computing system 700 when a failure of an uplink 704 from a TOR switch 705 occurs. FIG. 7 further shows the forwarding links (solid lines) and blocking links (dotted lines) using a SCLP protocol. FIG. 7 illustrates how the SCLP firmware creates a separation of data traffic between the external network attached to the stacked chassis (i.e. 210, 310, 340, 710, 720 and 730) and the internal network between the stacked chassis. The stack chassis will not create a duplicate connection between elements outside the stack. The TOR switches 305 and 705 can configure all ports connected to the chassis as host ports and not be concerned about a communication loop being created. The use of the SCLP firmware allows for users to not be concerned about data traffic that flows through the stacked chassis that does not terminate within or originate from the stacked chassis.

Rack-configured networked computing system 700 includes TOR switches 305 and 705 and chassis 210, 310, 340, 710, 720 and 730. Each chassis 710, 720 and 730 can have the same internal components as chassis 210 of FIG. 2. Chassis 710 includes a CMD 712 and a CMD 714. CMD 712 and CMD 714 are communicatively coupled to each other by link 716. A controller within CMD 712 can cause ports within CMD 712 to be blocked and unblocked. Another controller within CMD 714 can cause ports within CMD 714 to be blocked and unblocked. Chassis 720 includes a CMD 722 and a CMD 724. CMD 722 and CMD 724 are communicatively coupled to each other by link 726. A controller within CMD 722 can cause ports within CMD 722 to be blocked and unblocked. Another controller within CMD 724 can cause ports within CMD 724 to be blocked and unblocked. Chassis 730 includes CMD 732 and CMD 734. CMD 732 and CMD 734 are communicatively coupled to each other by link 731. A controller within CMD 732 can cause ports within CMD 732 to be blocked and unblocked. Another controller within CMD 734 can cause ports within CMD 734 to be blocked and unblocked.

Chassis 340 communicates with chassis 730 via stacking link 790. In the case of a failure of uplink 704 from TOR switch 705, (indicated by X), individual controllers executing stacked chassis loop prevention firmware will configure uplinks 380, 386, 782, 784, and 786 as blocking links. Uplink 384 is configured as a forwarding link. Stacking links 370, 372, 376, 770, 774 and 790 are configured as forwarding links. Stacking links 374, 772 and 776 are configured as blocking links. Stacking links 231, 716, 726, and 731 are configured as forwarding links. Stacking links 331 and 341 are also configured as blocking links. The use of the stacked chassis loop prevention protocol prevents traffic from TOR switch 705 from cascading through chassis 710, 720, and 730, thus preventing communication loops. Only one uplink (i.e. uplink 384) is configured as a forwarding link at a point in time.

Figure 8:
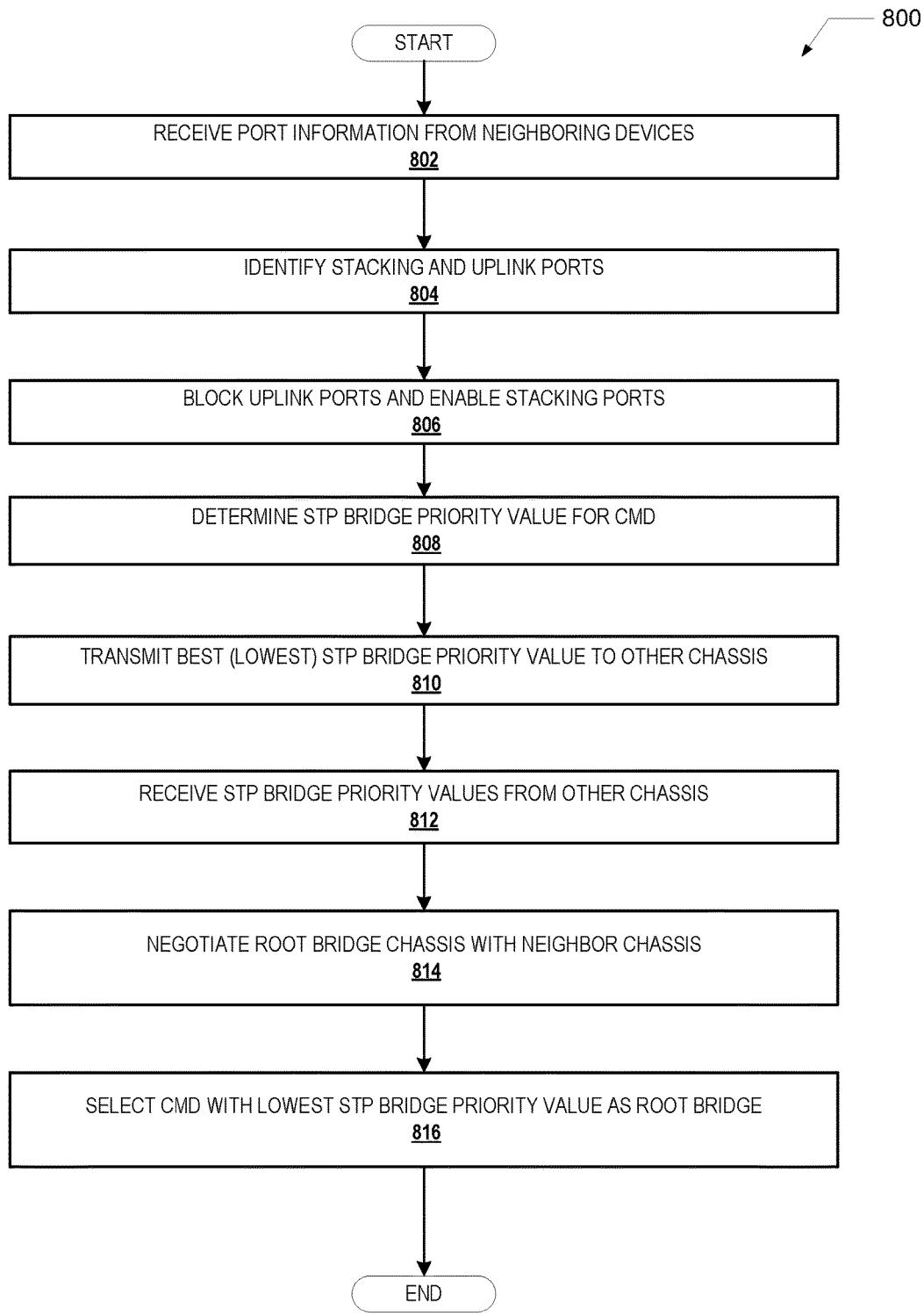
FIG. 8 is a flow chart illustrating one example of a method for determining a root bridge chassis.
Figure 9:
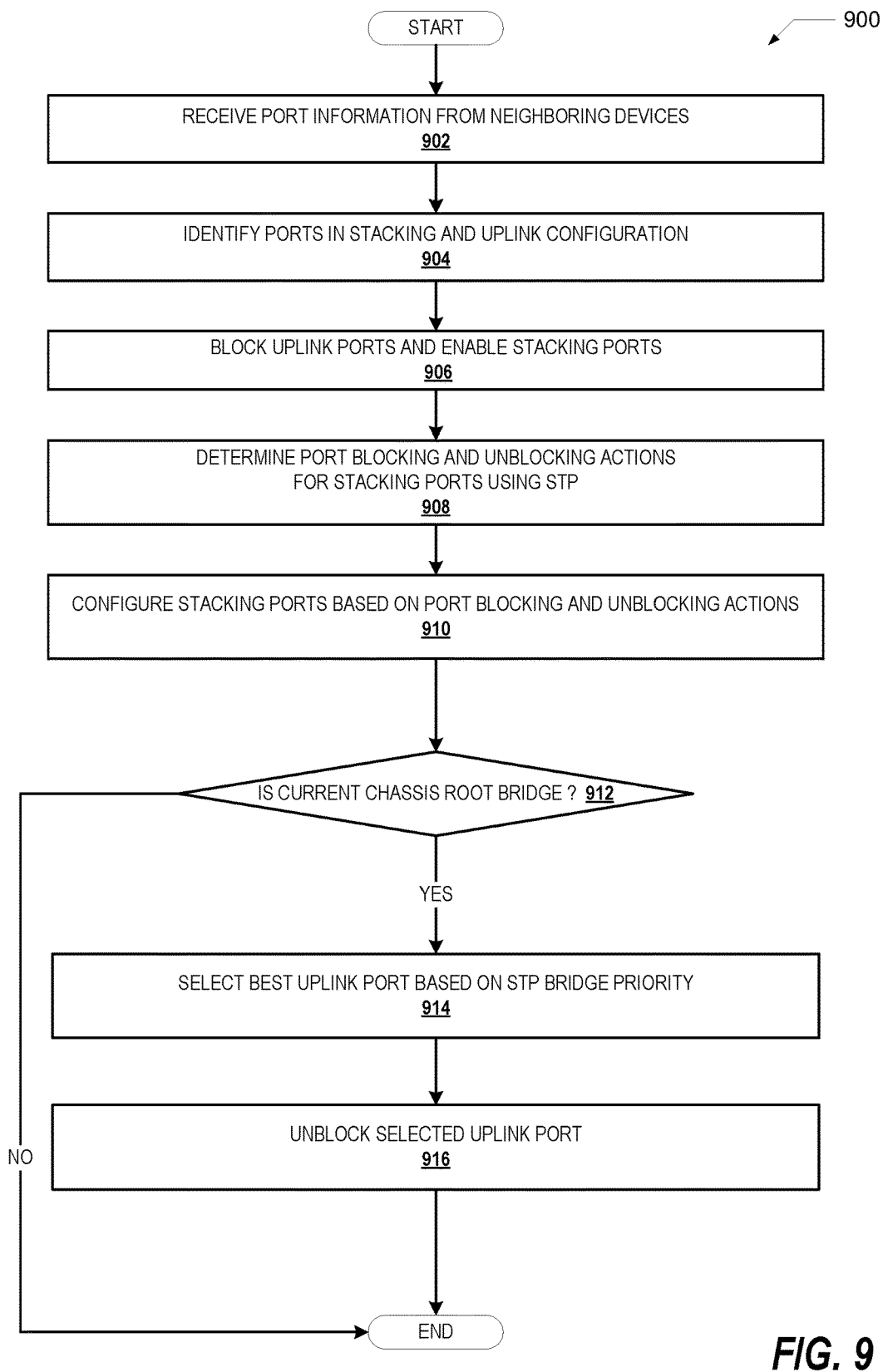
FIG. 9 is a flow chart illustrating one example of a method for using a chassis loop prevention protocol to determine forwarding and blocking links.

FIGS. 8 and 9 illustrate flowcharts of exemplary methods 800 and 900 by which controller 252 within the preceding figures performs different aspects of the processes that enable the one or more embodiments of the disclosure. Generally, method 800 represents a computer-implemented method for determining a root bridge chassis. Method 900 represents a computer-implemented method for determining forwarding and blocking links. The description of methods 800 and 900 is provided with general reference to the specific components illustrated within the preceding FIGS. 1-7. Generally, methods 800 and 900 are described as being implemented via controller 252 and particularly the execution of code provided by stacked chassis loop prevention firmware 412 acting within controller 252. It is however appreciated that certain aspects of the described methods may be implemented via other processing devices and/or execution of other code.

FIG. 8 illustrates a method 800 for determining a root bridge chassis. Method 800 is illustrated as being performed by controller 252; however in one embodiment, each controller within rack-configured networked computing environment or system 300 can execute method 800. Referring to the flow chart of FIG. 8, method 800 begins at the start block and proceeds to block 802 where controller 252 receives port information about neighbor devices from switch 256. Switch 256 uses link layer discovery protocol (LLDP) to obtain port information about connected ports and links. LLDP is used by network devices for advertising their identity and capabilities and for discovering neighboring devices. The port information includes which ports are stacking ports and uplink ports. Controller 252 identifies the stacking ports (i.e. port 262 and 258) and the uplink ports (i.e. port 260) from the port information (block 804). The determination of whether a port or link is stacking (i.e. an "inside" stack of common equipment port or link) or an uplink (i.e. a port or link "outside" of the stack) is done via a neighbor discovery protocol (i.e. LLDP or similar). There is a special type length value (TLV) that is added to the LLDP that is sent. If a neighbor device sees that TLV in the received LLDP, the neighbor device understands that similar equipment is on the other end of the link and automatically defines the port or link as being stacked.

Controller 252 blocks the uplink ports (i.e. port 260) such that uplink 380 is a blocking link, and controller 252 enables the stacking ports (i.e. port 262) such that stacking link 370 is a forwarding link (block 806). Controller 252 determines the STP bridge priority value for CMD 250 (block 808). Each CMD within each chassis determines an internal STP bridge priority value based on whether or not the chassis has an uplink and the quality of the uplink. The highest byte of uplink quality value is 0xC, if there is no TOR switch connection, 0x4 if there is 100 Mb TOR switch connection, and 0x0 if there is a 1 Gb TOR switch connection. The STP bridge priority value is a combination of the uplink quality value prefixed to the media access control (MAC) address of the switch. The CMD with the best uplink connection and lowest MAC address will have the lowest STP bridge priority value and will become the root bridge chassis. If a TOR switch connection changes, the STP bridge priority value will change and the root election process will be re-run.

Controller 252 transmits it's STP bridge priority value to the other controllers of chassis 310 and 340 (block 810). Controller 252 receives STP bridge priority values from each of the other chassis 310 and 340 (block 812). Controller 252 negotiates which chassis is the root bridge chassis with the other chassis 310 and 340. The CMD having the lowest STP bridge priority value will be the root bridge chassis (block 814). Controller 252 selects the chassis and CMD having the lowest STP bridge priority value as the root bridge (block 816). Method 800 then ends.

FIG. 9 illustrates a method 900 for determining forwarding and blocking links within networked computing environment or system 300. Method 900 is illustrated as being performed by controller 252; however in one embodiment, each controller within networked computing environment or system 300 can execute method 900. Referring to the flow chart of FIG. 9, method 900 begins at the start block and proceeds to block 902 where controller 252 receives port information about neighbor devices from switch 256 using link level discovery protocol (LLDP). The port information includes which ports are stacking ports and uplink ports. Controller 252 identifies the stacking ports (i.e. ports 262 and 258) and the uplink ports (i.e. uplink port 260) from the port information (block 904). Controller 252 blocks the uplink ports (i.e. uplink port 260) such that uplink 380 is a blocking link, and controller 252 enables the stacking ports (i.e. stacking port 262) such that stacking link 370 is a forwarding link (block 906).

Controller 252 determines port blocking and unblocking actions for the stacking ports using an STP algorithm (block 908), and controller 252 configures the stacking ports based on the determined port blocking and unblocking actions (block 910). In an embodiment, controller 252 can configure port 262 as blocked, causing stacking link 370 to be a blocking link. In another embodiment, controller 252 can configure port 262 as unblocked causing stacking link 370 to be a forwarding link. At decision block 912, controller 252 determines if chassis 210 (CMD 250) is the root bridge chassis. In response to chassis 210 not being the root bridge chassis, method 900 terminates. In response to chassis 210 being the root bridge chassis, controller 252 selects one of the uplink ports in switch 256 (i.e. uplink port 260) based on the STP bridge priority value for the uplink ports in switch 256 (block 914). Controller 252 configures the selected uplink port 260 as an unblocked port, causing uplink 380 to be a forwarding link. Method 900 then ends.

In an embodiment, SCLP 412 executing on controller 252 can provide redundancy and/or fault isolation. SCLP continues to run in the background in the event of a failure or loss of links. If an "uplink" is degraded or lost or if the stack of chassis is split, the result can be that enough of the stacking ports are lost that the stack of chassis can become two or more independent stacks of chassis. If the current root bridge has an equally good uplink then that port will be unblocked. If the current root bridge does not have as good an uplink (i.e root bridge priority value) as another CMD in the stack of chassis then that CMD will become the root bridge and the uplink will change. If the stack of chassis is split, the new stack will elect its own root bridge that has its own uplink.

Figure 10:
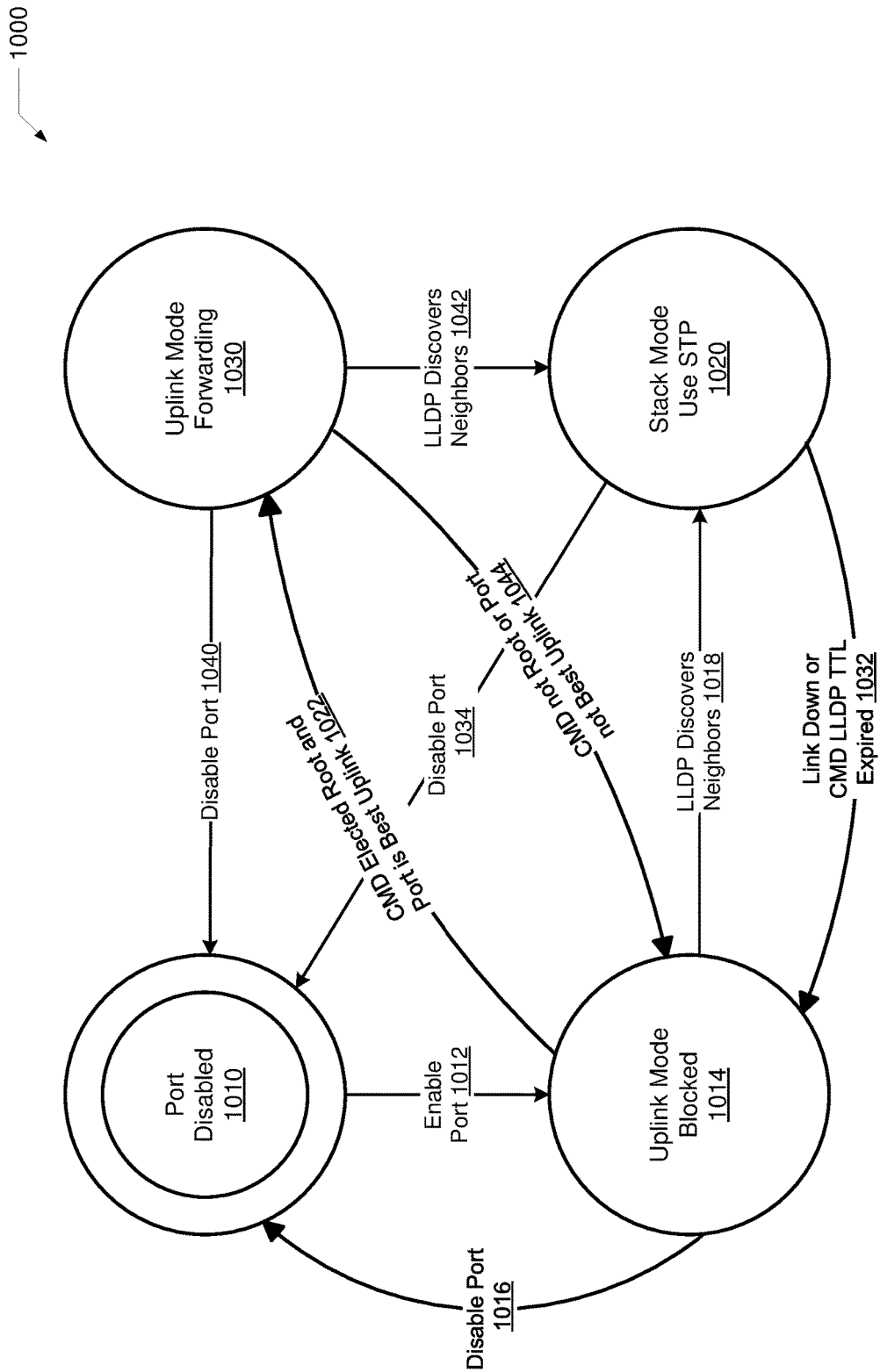
FIG. 10 illustrates one example of a state diagram for performing a stacked chassis loop prevention protocol.

FIG. 10 illustrates a state diagram 1000 of port states using the SCLP protocol in a networked computing system. In one embodiment, state diagram 1000 can be performed by a CMD controller such as controller 252 executing SCLP firmware 412. Referring to FIG. 10, state diagram 1000 begins at port disabled state 1010 where specific ports (i.e. ports 258-262) under the control of controller 252 are disabled. If an input is received to enable port 1012, the port state shifts to uplink mode blocked state 1014. If an input is received at uplink mode blocked state 1014 to disable port 1016, the port state shifts back to port disabled state 1010. If an input is received at uplink mode blocked state 1014 to use an LLDP daemon to discover the neighboring devices (controllers and chassis) 1018, the port state shifts to stack mode state 1020 where STP is used to determine the forwarding state of the port. If the LLDP daemon determines that the neighbor of this port is another chassis, the port switches to stacked mode. The LLDP daemon uses the nearest customer bridge address (MAC 01:80:C2:00:00:00). This MAC address is also used for BPDUs that flow through most switches even when a port is in the blocked state. If an input is received at uplink mode blocked state 1014 for the CMD to be elected the root bridge and the port has the best uplink (lowest STP bridge priority value) 1022, the port state shifts to uplink mode forwarding state 1030 where the port is enabled as an uplink. The CMD has one root priority. The quality of the best uplink sets the root priority for the CMD. After the CMD becomes a root, the CMD unblocks the best (highest speed) uplink it has. If there are multiple "best" uplinks the one with the lowest port index (i.e. root bridge priority value is chosen.

If an input is received at stack mode state 1020 for the port to be disabled port 1034, the port state shifts to disabled port state 1010. If an input is received at stack mode state 1020 that the port link is down or the LLDP time to live (TTL) has expired 1032, the port state shifts to uplink mode block state 1014. If an input is received at uplink mode forwarding state 1030 for the port to be disabled port 1040, the port state shifts to disabled port state 1010. If an input is received at uplink mode forwarding state 1030 to use LLDP to discover the neighboring devices (controllers and chassis) 1042, the port state shifts to stack mode state 1020. If the LLDP daemon determines that the neighbor of this port is another chassis, the port switches to stacked mode. If an input is received at uplink mode forwarding state 1030 where the CMD is not the root bridge or does not have the port with the beset uplink 1044, the port state shifts to uplink mode blocked state 1014.

Figure 11:
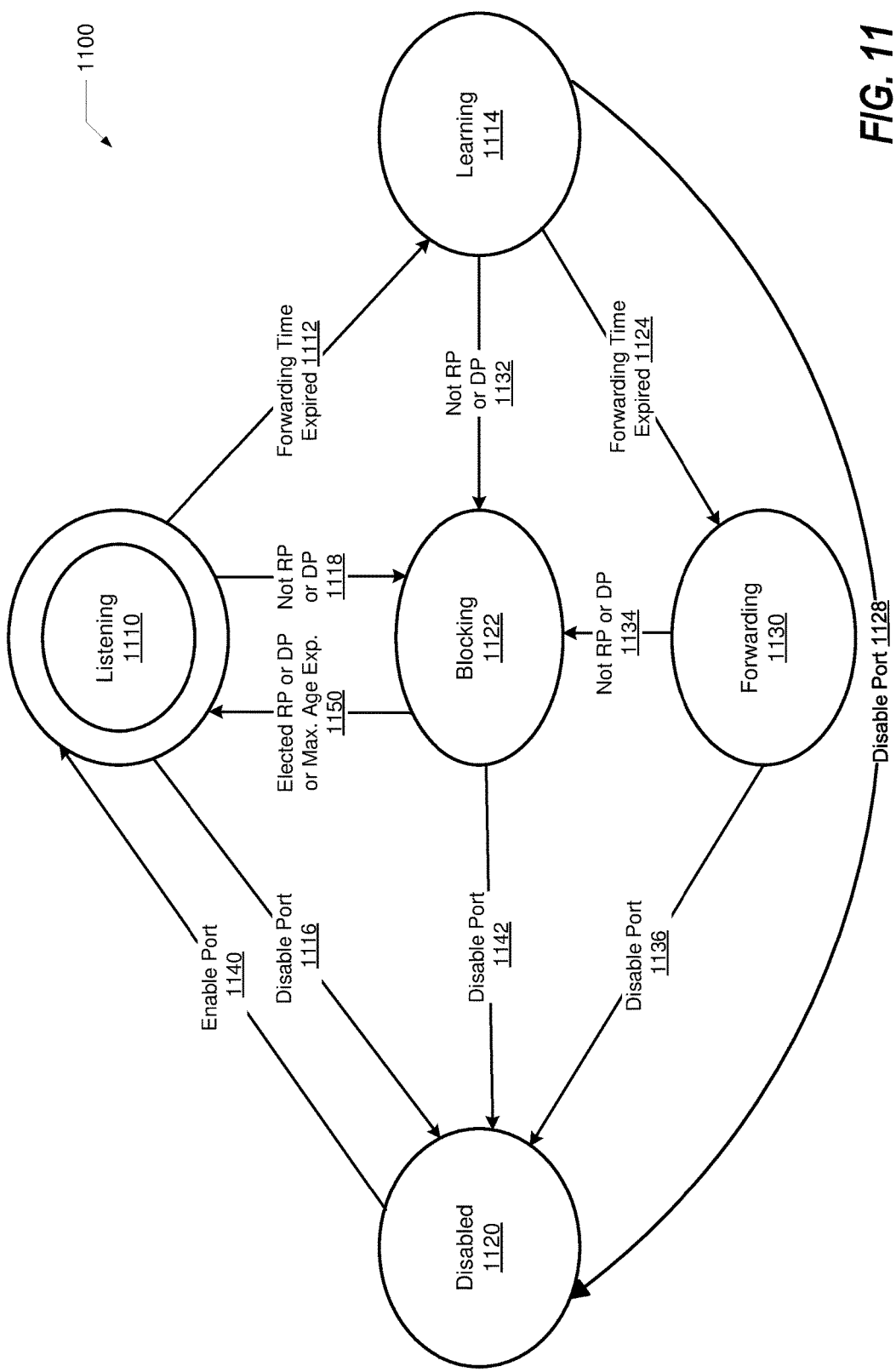
FIG. 11 illustrates one example of a state diagram for performing a spanning tree protocol.

FIG. 11 illustrates a state diagram 1100 of port states using STP in a networked computing system. In one embodiment, state diagram 1100 can be performed by a CMD controller such as controller 252. Referring to FIG. 11, state diagram 1100 begins at listening state 1110 where CMD 250 acts as if it is a root bridge, and enters the listening state to determine the active topology for a period of time. In the listening state, ports are sending and receiving BPDUs to determine the active topology. If the forwarding time expires 1112, the port state shifts to learning mode state 1114. In the learning state, bridging tables are being generated. If an input is received in listening mode 1110 to disable the port 1116, the state shifts to port disabled state 1120. If an input is received in listening mode 1110 to that the port is not a root port or a designated port 1118, the state shifts to port blocking state 1122 where the port is blocked. If this port is not the least cost path to the root bridge (root port) or along the least cost path for another CMD or the designated port for a link between CMDs that are not along the shortest path to the root, this port will become blocked.

If an input is received at learning state 1114 that the forwarding time has expired 1124, the port state shifts to forwarding state 1130. In the forwarding state, data is forwarded via the ports. If an input is received at learning state 1114 that the port is to be disabled 1128, the port state shifts to disabled state 1120. If an input is received at learning state 1114 that the port is not a root port or a designated port 1132, the state shifts to blocking state 1122 where the port is blocked. If an input is received at forwarding state 1130 for the port to be disabled 1136, the state shifts to disabled state 1120. If an input is received at forwarding state 1130 that the port is not a root port or a designated port 1134, the state shifts to blocking state 1122.

If an input is received at disabled state 1120 for the port to be enabled 1140, the state shifts to listening state 1110. If an input is received at blocking state 1122 for the port to be disabled 1142, the state shifts to disabled port state 1120. If an input is received at blocking state 1122 that the port has been elected a root port or a designated port or the maximum age has expired 1150, the state shifts to listening state 1110. At input 1150, no BPDUs are received before the maximum age expires.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims.

Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
   identifying, via a controller of an information handling system, at least one stacking port in a first switch of a first chassis, the first switch being in communication with a second switch of a second chassis via a first link;
   configuring the at least one stacking port as an unblocked port;
   determining port blocking and unblocking actions for the at least one stacking port of the first switch;
   configuring the at least one stacking port based on the determined port blocking and unblocking actions;
   determining if the first chassis is a root bridge chassis having at least one uplink port; and
   in response to the first chassis being a root bridge chassis, configuring a first uplink port in the first switch as an unblocked port.

2. The method of claim 1, wherein determining the port blocking and unblocking actions for the stacking ports comprises determining port blocking and unblocking actions based on a loop prevention protocol.

3. The method of claim 1, wherein determining if the first chassis is a root bridge chassis further comprises:
   determining a first spanning tree protocol (STP) bridge priority value for a first chassis management device (CMD) associated with the controller;
   receiving a second STP bridge priority value for other communicatively coupled CMDs;
   identifying, from among the CMDs, the CMD having the lowest STP bridge priority value; and
   selecting the CMD having the lowest STP bridge priority value as the root bridge chassis.

4. The method of claim 3, wherein the STP bridge priority value is based on a combination of an uplink quality value and a media access control (MAC) address.

5. The method of claim 1, wherein the at least one stacking port communicatively couples the first chassis to the second chassis via a virtual local area network, the first and second chassis being in a stacked configuration and the first uplink port communicatively couples the first chassis to an external device.

6. The method of claim 1, further comprising:
receiving port information from the second switch;
identifying uplink ports of the second switch based on the received port information; and
blocking the uplink ports of the second switch.

7. The method of claim 6, wherein the received port information is link level discovery protocol data.

8. An information handling system (IHS) comprising:
a first chassis including a first chassis management device (CMD) communicatively coupled to at least one processing node, the first CMD including a controller communicatively coupled to a first switch, the first switch including at least one stacking port and at least one uplink port;
a second chassis including a second switch, the first switch being in communication with the second switch via a first link, the chassis management device including a memory device communicatively coupled to the controller, the memory device storing stacked chassis loop prevention (SCLP) firmware, wherein the SCLP firmware configures the controller to:
identify at least one stacking port in the first switch;
configure the at least one stacking port as an unblocked port;
determine port blocking and unblocking actions for the at least one stacking port of the first switch;
configure the at least one stacking port based on the determined port blocking and unblocking actions;
determine if the first chassis is a root bridge chassis having at least one uplink port; and
in response to the first chassis being a root bridge chassis, configure the uplink port in the first switch as an unblocked port.

9. The information handling system of claim 8, wherein the controller determines the port blocking and unblocking actions for the stacking ports based on a loop prevention protocol.

10. The information handling system of claim 8, wherein the SCLP firmware further configures the controller to:
determine a first spanning tree protocol (STP) bridge priority value for the first CMD;
receive a second STP bridge priority value for other CMDs communicatively coupled to the first CMD;
identify, from among the CMDs, the CMD having the lowest STP bridge priority value; and
select the CMD having the lowest STP bridge priority value as the root bridge chassis.

11. The information handling system of claim 10, wherein the STP bridge priority value is based on a combination of an uplink quality value and a media access control (MAC) address.

12. The information handling system of claim 8, wherein the at least one stacking port communicatively couples the first chassis to the second chassis via a virtual local area network, the first and second chassis being in a stacked configuration and the first uplink port communicatively couples the first chassis to an external device.

13. The information handling system of claim 8, wherein the SCLP firmware further configures the controller to:
receive port information from the second switch;
identify uplink ports of the second switch based on the received port information; and
block the uplink ports of the second switch.

14. The information handling system of claim 13, wherein the received port information is link level discovery protocol data.

15. A switching system for preventing communication loops comprising:
a first chassis including a first chassis management device (CMD) communicatively coupled to at least one processing node, the first CMD including a controller communicatively coupled to a first switch, the first switch including at least one stacking port and at least one uplink port;
a second chassis including a second switch, the first switch being in communication with the second switch via a first link, the chassis management device including a memory device communicatively coupled to the controller, the memory device storing stacked chassis loop prevention (SCLP) firmware, wherein the SCLP firmware configures the controller to:
identify at least one stacking port in the first switch;
configure the at least one stacking port as an unblocked port;
determine port blocking and unblocking actions for the at least one stacking port of the first switch;
configure the at least one stacking port based on the determined port blocking and unblocking actions;
determine if the first chassis is a root bridge chassis having at least one uplink port; and
in response to the first chassis being a root bridge chassis, configure the uplink port in the first switch as an unblocked port.

16. The switching system of claim 15, wherein the controller determines the port blocking and unblocking actions for the stacking ports based on a loop prevention protocol.

17. The switching system of claim 15, wherein the SCLP firmware further configures the controller to:
determine a first spanning tree protocol (STP) bridge priority value for the first CMD;
receive a second STP bridge priority value for other CMDs communicatively coupled to the first CMD;
identify from among the CMDs the CMD having the lowest STP bridge priority value; and
select the CMD having the lowest STP bridge priority value as the root bridge chassis.

18. The switching system of claim 17, wherein the STP bridge priority value is based on a combination of an uplink quality value and a media access control (MAC) address.

19. The switching system of claim 15, wherein the at least one stacking port communicatively couples the first chassis to the second chassis via a virtual local area network, the first and second chassis being in a stacked configuration and the first uplink port communicatively couples the first chassis to an external device.

20. The switching system of claim 15, wherein the SCLP firmware further configures the controller to:
receive port information from the second switch;
identify uplink ports of the second switch based on the received port information; and
block the uplink ports of the second switch.

* * * * *